United States Patent
Tort et al.

[19]

[11] Patent Number: 6,073,391
[45] Date of Patent: Jun. 13, 2000

[54] TREE SUPPORT WITH WRAPPING, STRAP AND FASTENER

[76] Inventors: Eric C. Tort; Jean Claude Tort, both of P.O. Box 1816, Ruskin, Fla. 33570

[21] Appl. No.: 09/107,161

[22] Filed: Jun. 29, 1998

[51] Int. Cl.[7] ........................................ A01G 5/00
[52] U.S. Cl. ..................................................... 47/42
[58] Field of Search ................... 47/23, 24, 42, 47/43, 46; 248/218.4, 219.4, 230.8, 499, 519

[56] References Cited

U.S. PATENT DOCUMENTS

| | | |
|---|---|---|
| 3,505,761 | 4/1970 | Prieur . |
| 3,521,401 | 7/1970 | Shisler . |
| 3,526,056 | 9/1970 | Stropkay . |
| 4,480,403 | 11/1984 | Williams . |
| 4,649,666 | 3/1987 | Ness et al. . |
| 4,852,299 | 8/1989 | Smoak et al. . |
| 4,896,454 | 1/1990 | Cronenwett et al. ................. 248/219.4 |
| 5,199,214 | 4/1993 | Caldwell ...................................... 47/42 |
| 5,402,600 | 4/1995 | Tompkins ..................................... 47/42 |
| 5,542,210 | 8/1996 | Hupfl . |
| 5,568,700 | 10/1996 | Veneziaiano et al. ................... 47/42 X |

FOREIGN PATENT DOCUMENTS

| | | |
|---|---|---|
| 1423854 | 11/1965 | France ......................................... 47/42 |
| 2809388 | 9/1979 | Germany . |
| 2244089 | 11/1991 | United Kingdom . |

*Primary Examiner*—Michael J. Carone
*Assistant Examiner*—Jeffry L. Gellner
*Attorney, Agent, or Firm*—Frijouf, Rust & Pyle, P.A.

[57] ABSTRACT

An apparatus and method is disclosed for an improved device for supporting a tree with a cable. The device comprises a wrapping for encircling the tree. A strap tethers the wrapping to the tree. A fastener is secured to the wrapping for affixing to the cable to support the tree by the cable.

20 Claims, 8 Drawing Sheets

TREE SUPPORT WITH WRAPPING, STRAP AND FASTENER

BACKGROUND OF THE INVENTION

1. Field of the Invention

This invention relates to horticulture and more particularly to an improved supporting device for supporting a plant or a tree through a wire or cable secured to a foundation surface.

2. Background of the Invention

Various types of supporting devices have been provided in the prior art for supporting a plant or a tree. In general, the supporting devices of the prior art have been used for supporting young plants or trees in two different situations. Firstly, the supporting devices of the prior art were used for supporting young plants or trees with underdeveloped root systems. The underdeveloped root systems did not provide sufficient anchoring for the plant or tree to withstand strong winds. Secondly, the supporting devices of the prior art were used for supporting young plants or trees located within root containers or root bags. In this situation, the root container or root bags provided little or no support for the young plant or tree from strong winds.

The supporting devices of the prior art can be found in various configurations. The following United States patents are examples of supporting devices proposed by the prior art for meeting the needs of supporting young plants or trees in either a nursery or in a commercial or residential installation.

U.S. Pat. No. 3,505,761 to Prieur discloses a tree support in which the belt encircling the tree trunk is fastened to a stake. The tree support is made of inert non-wettable material which prevents the growth of microorganisms at the point of contact of the belt with the tree trunk.

U.S. Pat. No. 3,521,401 to Shisler discloses a tree support which is adjustable with respect to a given tree diameter to be encircled and adjustable with respect to the distance between the tree and a stationary base. The tree encircling portion is non-abrasive.

U.S. Pat. No. 3,526,056 to Stropkay discloses a tree tie and the like comprising a single length of nylon strap having adjustable loops at its respective ends, with the strap ends at such loops secured solely by threading about retainer sleeves or slides. A winding device can be applied to the strap for variable shortening of the same.

U.S. Pat. No. 4,480,403 to Williams discloses a support apparatus for supporting a cantilevered beam from a T-shaped post. A bracket having a cross-shaped aperture therein composed of a pair of spaced horizontal plates joined along one edge by vertical center plates is attached to an end of the cantilevered beam for sliding registry with the post. A bolt is threaded through a hole in the center plate to bear against the post, and an alternate method utilizes two bolts. The first embodiment disclosed uses a first collar portion attached to a free end of the beam and a second collar portion to form a cylindrical collar for a plant support. The second embodiment utilizes a flat plate on the cantilevered beam for supporting a mailbox or the like. A third embodiment has a pair of hooks attached to the cantilevered beam for hanging support of a sign. The fourth embodiment includes a pair of outwardly curving horizontal arms each of which has a cylindrical pin extending upwardly therefrom for registry in corresponding holes in a device to be supported such as the plant holder disclosed in U.S. Pat. No. 4,249,342.

U.S. Pat. No. 4,649,666 to Ness et al. discloses a tree support of self-stabilizing type including a pair of yieldable assemblies each comprising a first hook adapted to be attached to the upper portion of a stake, a second hood having a yieldable covering adapted to be attached to the trunk of a tree to be stabilized, and a tension spring having opposite ends respectively connected to the aforementioned hooks and extending therebetween. The pair of yieldable assemblies are connected between a tree to be stabilized and a pair of similar vertical stakes spaced at opposite sides of the tree and spaced from the tree sufficiently that the springs of the assemblies are under at least limited tension and the assemblies being operable to return the tree to initial vertical position regardless of the direction in which the tree is swayed by wind or otherwise.

U.S. Pat. No. 4,852,299 to Smoak et al. discloses a tree support strap which is made of a climatologically degradable material so that it will deteriorate and fall away from the tree after an initial period of support lasting a predetermined period of time. The support strap attaches to conventional stays or guy wires but does not require these wires to actually contact the trunk of the tree.

U.S. Pat. No. 5,542,210 to Hupfl discloses an apparatus for supporting various different types of plantlife growing in a ground area including stakes adapted to be inserted into the ground with preferably a pointed end formed of hard plastic preferably recycled. The one or more stakes define a slot extending therethrough adapted to receive a supporting strap of hard or preferably recycled plastic. The supporting strap includes a flat surface adapted to support the shaft of a vertically growing plant or tree without damaging thereto. The strap is preferably generally rectangular in cross section and includes a plurality of studs thereon and defines a plurality of apertures therein. The studs are adapted to extend through the apertures to form the supporting strap into circular formations of varying lengths for supporting of plantlife growing adjacent to the stake. The supporting strap is designed to extend through the preferably rectangular slots in the stakes to facilitate support. A tubular locking device is included for extending about the studs at the location where they are locked with respect to the apertures to facilitate maintaining of retainment therebetween. The tubular locking device preferably extends about the supporting strap and is movable longitudinally therealong.

U.K. Patent 2,244,089A to Nash discloses a method of securing two adjacent members together, comprising the steps of encircling at least part of one member and at least part of the adjacent member with a length of rope or cable so as to bind the first member to the latter; and adjustably securing together the free ends of the rope or cable by means of a securing device comprising a plate having for each of the free ends of the rope or cable a respective series of at least two apertures through which the rope or cable can be woven in use, such that when the two free ends of the rope or cable are threaded through their respective series of apertures, they are thereby held in position relative to the plate.

Although the foregoing patents have attempted to meet the needs of the prior art, the aforementioned patents suffered from certain deficiencies and accordingly have not solved the needs of the horticultural art.

A major deficiency of the prior art supporting devices set forth above was the fact that each of the supporting devices had to be individually secured to a foundation surface by separate wires or cables. Unfortunately, a plurality of supporting devices could not be used with the same wire or cable in a supporting system. If the same wire or cable was used to secure a plurality of the supporting devices affixed to a plurality of trees, the individual tree could not be readily removed from the supporting system.

Another major deficiency of the prior art supporting devices set forth above was the fact that many of these supporting devices were overly complex and overly expensive. Furthermore, many of these prior art supporting devices damaged the plant or tree during periods of high wind.

Accordingly, it is an object of the present invention to provide an improved device for supporting a tree with a cable wherein the device may be utilized within a supporting system for supporting a plurality of trees.

Another object of the present invention is to provide an improved device for supporting a tree with a cable which is capable of being used with a plurality of similar devices for supporting a plurality of trees from a single cable.

Another object of the present invention is to provide an improved device for supporting a tree with a cable which does not damage the tree during periods of high wind.

Another object of the present invention is to provide an improved device for supporting a tree with a cable which is inexpensive to manufacture and to use.

Another object of the present invention is to provide an improved device for supporting a tree with a cable which may be readily removed from the tree.

Another object of the present invention is to provide an improved device for supporting a tree with a cable which may be readily removed from the supporting cable in the remote event of the damage to the improved device.

Another object of the present invention is to provide an improved device for supporting a tree with a cable that is adaptable to plants and trees of various sizes.

Another object of the present invention is to provide an improved device for supporting a tree with a cable that is capable of withstanding a hostile outdoor environment.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description setting forth the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a device for supporting a tree with a cable comprising a wrapping for encircling the tree. A strap tethers the wrapping to the tree. A fastener is secured to the wrapping for affixing to the cable to support the tree by the cable.

In one embodiment of the invention, the wrapping includes a substantially flexible wrapping extending between a first and a second wrapping end. The wrapping encircles the tree with the second end of the wrapping overlapping the first end of the wrapping.

Preferably, the strap comprises a flexible cord for tethering the wrapping to the tree. The cord extends between a first and a second cord end with the first cord end being secured to the fastener.

In one embodiment of the invention, the fastener includes a mechanical fastener in the form of an eyelet for securing to a cable. In another embodiment of the invention, the fastener includes a mechanical fastener in the form of a compression fitting to provide a compression force to the cable for securing the mechanical fastener to the cable.

The fastener may comprise a first and a second threaded member. The first fastener member is secured to the wrapping. The second threaded member provides a compression force to the cable upon rotation of the second threaded member relative to the first threaded member for securing the fastener to the cable. The second threaded member is removable from the first threaded member for inserting and removing the cable from the fastener.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
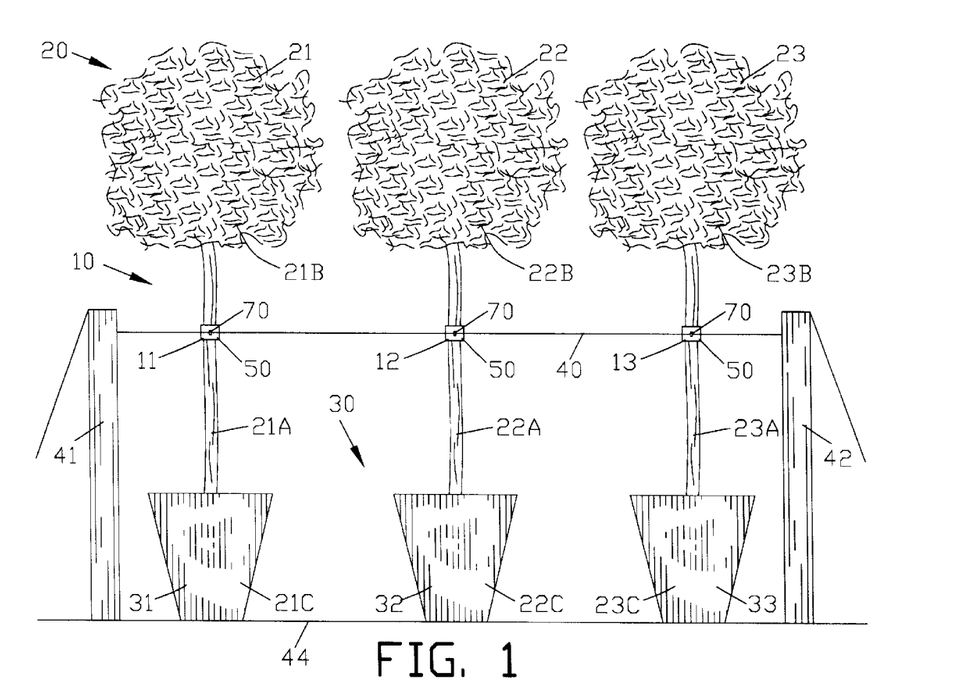
FIG. 1 is a view of a first embodiment of a support system for supporting a plurality of trees incorporating a plurality of support devices of the present invention.
Figure 2:
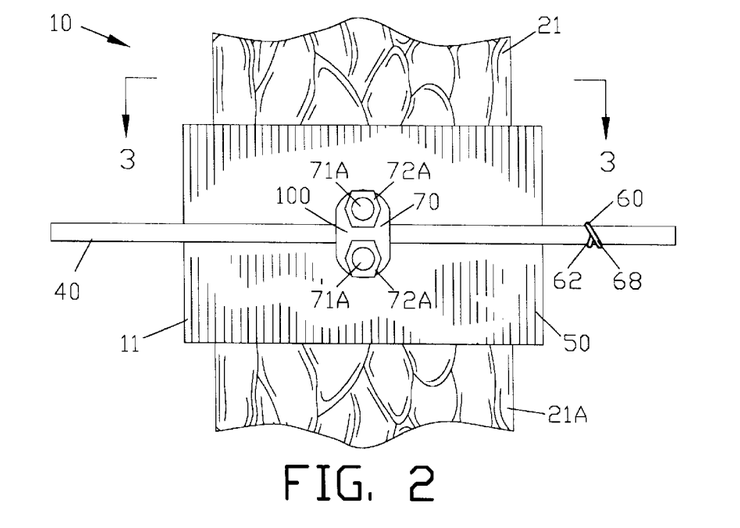
FIG. 2 is an enlarged view of a portion of FIG. 1.

FIG. 1 is a view of a first embodiment of a support system 10 incorporating a plurality of the support devices 11–13 of the present invention for supporting a plurality of trees 20 shown as trees 21–23. Although the present invention will be described with reference to trees, it should be understood that the present invention is suitable for use with plants or with vertically extending supports or stakes for plants and the like.

The trees 21–23 comprise tree trunks 21A–23A, tree foliage 21B–23B and tree roots 21C–23C. The roots 21C–23C of the plurality of trees 21–23 are respectively contained within a plurality of containers 30 shown as containers 31–33. The trees 21–23 are representative of young trees having roots 21C–23C located in containers 30 having a volume in the range of fifteen to twenty gallons. The trees 21–23 may be representative of very young trees having a height of six to eight feet in height or trees located in containers having a volume of fifteen gallons or may be representative of young trees having a height of fifteen to twenty feet located in containers having a volume of thirty gallons.

Many very young trees or young trees may be damaged permanently if the trees are toppled by a wind storm, an accident or the like. The toppling of these young tree may injure or break a limb thereby permanently damaging the tree. In an effort to prevent a tree from being toppled, various devices have been proposed by the prior art to hold or to restrained a tree. Unfortunately, many of these devices of the prior art permanently scarred or damaged the trunks of the tree. Furthermore, many of the devices of the prior art were incapable of individually supporting a plurality of trees from a common support wire. The present invention overcomes these inadequacies of the prior art and provides a support system for trees which is simple, efficient and does not damage the tree.

The support system 10 of the present invention comprises a horizontally extending cable 40 shown as a braided steel wire extending between plural supports 41 and 42. The plural supports 41 and 42 are secured relative to a ground surface 44. Although the plural supports 41 and 42 have been shown as vertically extending posts, it should be understood that the support system 10 may be used with any type of support suitable for mounting the horizontally extending cable 40.

The support devices 11–13 respectively support the trees 21–23 by the horizontally extending cable 40. The support devices 11–13 are identical to one another and are capable of independently supporting the respective tree 21–23 by the same horizontally extending cable 40.

FIGS. 2–10 illustrate enlarged views of the support device 11 shown in FIG. 1. The support device 11 comprises a wrapping 50 extending between a first and a second wrapping end 51 and 52. The wrapping 50 defines an inner surface 54 and an outer surface 56. Preferably, the wrapping 50 is a substantially flexible wrapping formed from a flexible web of a natural or synthetic material. In one example, the wrapping 50 was constructed from a three-ply citri pac having a width of two to four inches and a length of one to two feet. The length of the wrapping 50 is selected to be sufficient to encircle the tree 11 with the second end 52 of the wrapping 50 overlapping the first end 51 of the wrapping 50.

The support device 11 comprises a strap 60 for tethering the wrapping 50 to the tree 11. The strap 60 comprises a substantially flexible cord 60 extending between a first and a second strap end 61 and 62.

An opening 66 is defined in the second end 52 of the wrapping 50. The first strap end 61 of the strap 60 is threaded through the opening 66 for securing the strap 60 to the second end 52 of the wrapping 50.

The strap 60 may be formed from a natural or synthetic material. In one example, the strap 60 was constructed from a one-quarter inch nylon ribbon having a length of one to two feet.

The support device 11 comprises a fastener 70 secured to the wrapping 50 for affixing to the horizontally extending cable 40 to support the tree 11. Preferably, the fastener 70 includes a mechanical fastener for securing to the cable 40. In one embodiment of the invention, the fastener 70 comprises a mechanical fastener in the form of a compression fitting 70 to provide a compression force to the cable 40 for securing said mechanical fastener 70 to the cable 40.

In this embodiment of the invention, the fastener 70 comprises a first and a second threaded member 71 and 72. The first threaded member 71 is shown as a plural first threaded members 71A and 71B whereas the second threaded member 72 is shown as a plural second threaded members 72A and 72B.

Figures 7, 8:
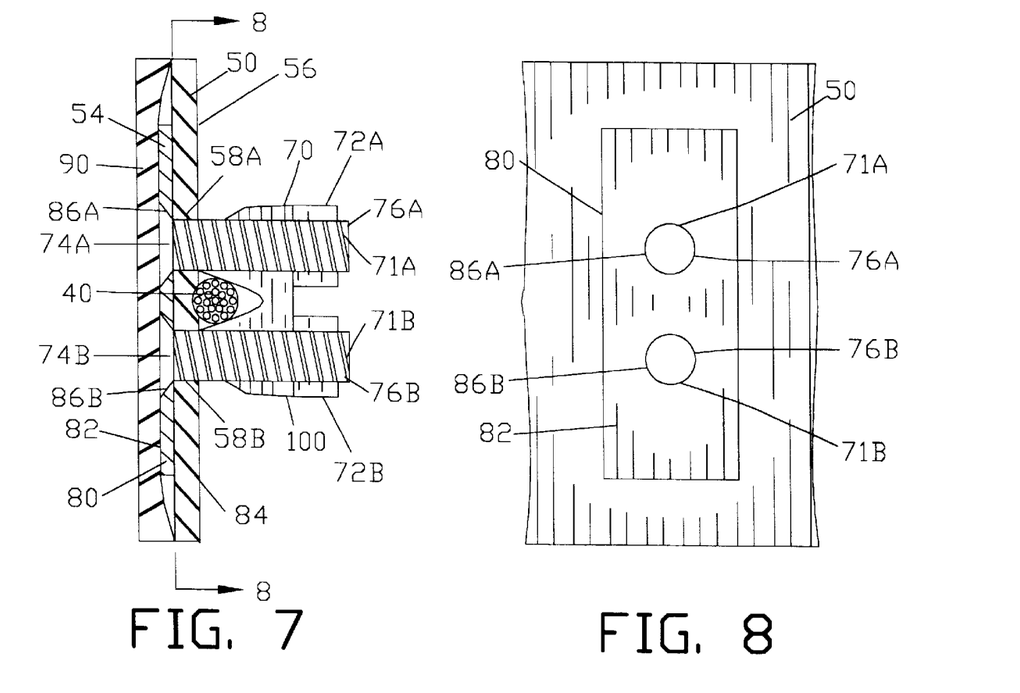
FIG. 7 is a sectional view along the line 7—7 in FIG. 4.
FIG. 8 is a sectional view along line 8—8 in FIG. 7.

As best shown in FIGS. 5–8, the first threaded members 71A and 71B are shown as flat head machine screws having a flat heads 74A and 74B and threaded shanks 76A and 76B. A mounting plate 80 defines an inner surface 82 and an outer surface 84. The outer surface 84 of the mounting plate 80 is disposed adjacent to the inner surface 54 of the wrapping 50. The mounting plate 80 includes plural tapered apertures 86A and 86B for respectively receiving the first threaded members 71A and 71B. The plural tapered apertures 86A and 86B are established to matingly receive the flat heads 74A and 74B of the first threaded members 71A and 71B such that the flat heads 74A and 74B are flush with the inner surface 82 of the mounting plate 80 as shown in FIG. 7.

The first threaded members 71A and 71B may be permanently secured to the mounting plate 80 by suitable means such as threads, friction engagement, press fit engagement, adhesives, braising, welding or the like. In the alternative, the first threaded members 71A and 71B may comprise threaded shanks 76A and 76B directly secured to the mounting plate 80 without the plural tapered apertures 86A and 86B. In this alternative, the first threaded members 71A and 71B may be permanently secured to the mounting plate 80 by suitable means such as threads, friction engagement, press fit engagement, adhesives, braising, welding or the like.

The first threaded member 71 is secured to the wrapping 50. In this embodiment, the threaded shanks 76A and 76B of the first threaded members 71A and 71B extend through the apertures 58A and 58B formed in the wrapping 50. The outer surface 84 of the mounting plate 80 is secured to the inner surface 54 of the wrapping 50 by suitable means such as a mechanical fastener or an adhesive or the like. The mounting plate 80 may be secured to the wrapping 50 by conventional mechanical hook tabs (not shown) pressed into the wrapping 50.

In one alternative of the invention, the first threaded members 71A and 71B are not permanently secured to the mounting plate 80 but are held captive by the protective member 90. In this example of the invention, the threaded shanks 76A and 76B of the first threaded fasteners 71A and 71B extend through the apertures 86A and 86B of the mounting plate 80 with the flat heads 74A and 74B being held captive within the plural tapered apertures 86A and 86B by the protective member 90.

The protective member 90 is disposed on the wrapping 50 to overlay the mounting plate 80 for protecting the tree 11 from the fastener 70. Preferably, the protective member 90 comprises a resilient padding material formed from a natural or synthetic material. The protective member 90 levels the unevenness formed about the periphery of the mounting plate 80. In addition, the protective member 90 levels any unevenness formed by the flat heads 74A and 74B of the first threaded fasteners 71A and 71B being non-flush with the inner surface 82 of the mounting plate 80. Preferably, the protective member 90 is permanently secured to the wrapping 50 by suitable means such as stitching, adhesives or the like.

The fastener 70 comprises a compression member 100 defining plural orifices 102A and 102B for respectively receiving the plural first threaded members 71A and 71B. The compression member 100 includes a tapered compression surface 104. The taper of the tapered compression surface 104 is established to accommodate for various radii of cables 40. The compression member 100 may be removed from the plural first threaded members 71A and 71B for enabling the insertion and the removal of the cable 40.

The second threaded members 72A and 72B are shown as plural machine nuts for threadably engaging with the threaded shanks 76A and 76B of the first threaded members 71A and 71B. The second threaded members 72A and 72B provide a compression force to the cable 40 through the compression member 100 upon rotation of the second threaded members 72A and 72B relative to the first threaded member 71A and 71B.

The cable 40 is interposed between the outer surface 56 of the wrapping 50 and the compression surface 104 of the compression member 100. A rotation of the second threaded members 72A and 72B relative to the first threaded member 71A and 71B moves the compression member 100 toward the outer surface 56 of the wrapping 50. The movement of the compression member 100 toward the outer surface 56 of the wrapping 50 move the compression surface 104 into engagement with the cable 40. A continued rotation of the second threaded members 72A and 72B relative to the first threaded member 71A and 71B moves the compression surface 104 into a compression engagement with the cable 40. The compression engagement with the cable 40 causes the cable 40 to compress the outer surface 56 of the wrapping 50. The compression engagement of the cable 40 along with the coefficient of friction of the outer surface 56 of the wrapping 50 creates a frictional force therebetween to inhibit relative movement between the wrapping 50 and the cable 40.

Figure 9:
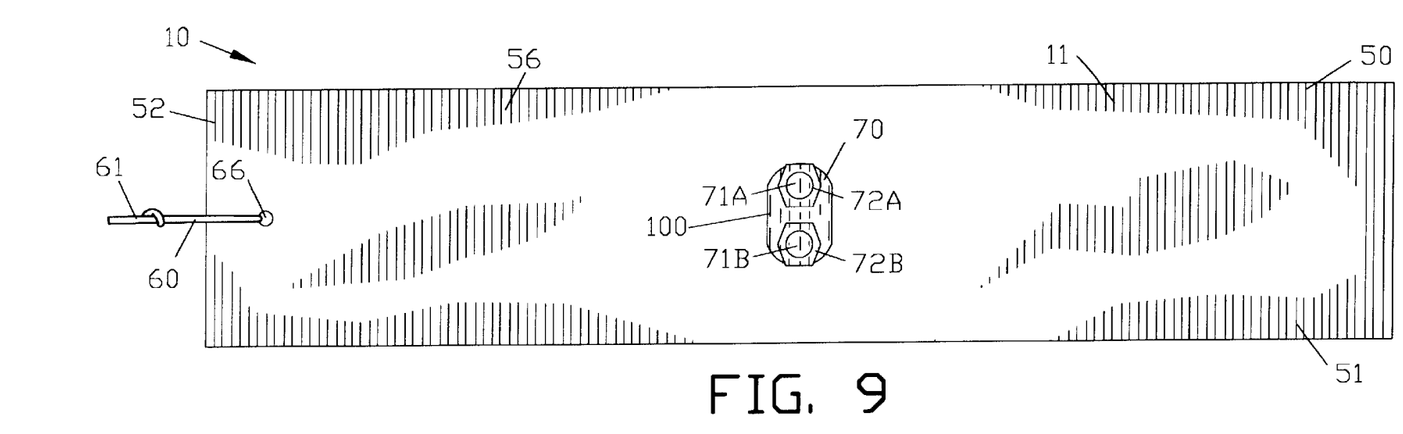
FIG. 9 is a front view of the supporting device of the first embodiment of the present invention prior to installation of a plant or tree.
Figure 10:
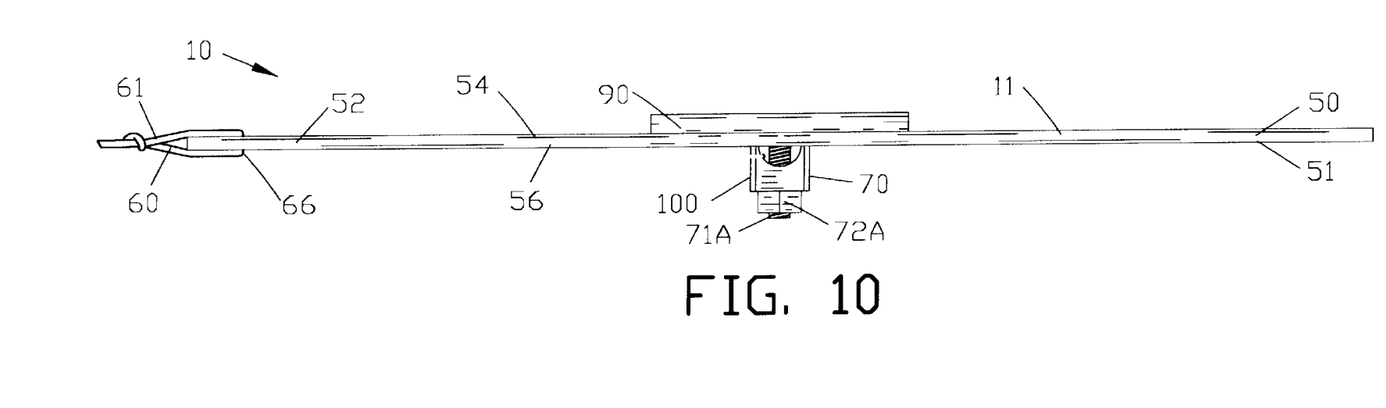
FIG. 10 is a top view of FIG. 9.

FIGS. 9 and 10 are front and top views of the supporting device 10 of the first embodiment of the present invention prior to installation on the tree 21. Prior to installing on the tree 21, the wrapping 50 is characterized as a longitudinal member extending between the first and second ends 51 and 52. The support device 11 is installed on the cable 40 in the following manner. Firstly, the second threaded fasteners 72A and 72B and the compression member 100 are removed from the first threaded fasteners 71A and 71B. Thereafter, the cable 40 is positioned between the first and second threaded fasteners 71A and 71B and the compression member 100 and the second threaded fasteners 72A and 72B are installed on the first threaded fasteners 71A and 71B. The second threaded fasteners 72A and 72B are rotated to provide a compressive force to the compression member 100. The compressive force of the compression member 100 is applied to the cable 40 to cause compression and deformation of the outer surface 56 of the wrapping 50. The compression engagement of the cable 40 along with the coefficient of friction of the outer surface 56 of the wrapping 50 creates a frictional force therebetween to inhibit relative movement between the wrapping 50 and the cable 40.

Figure 3:
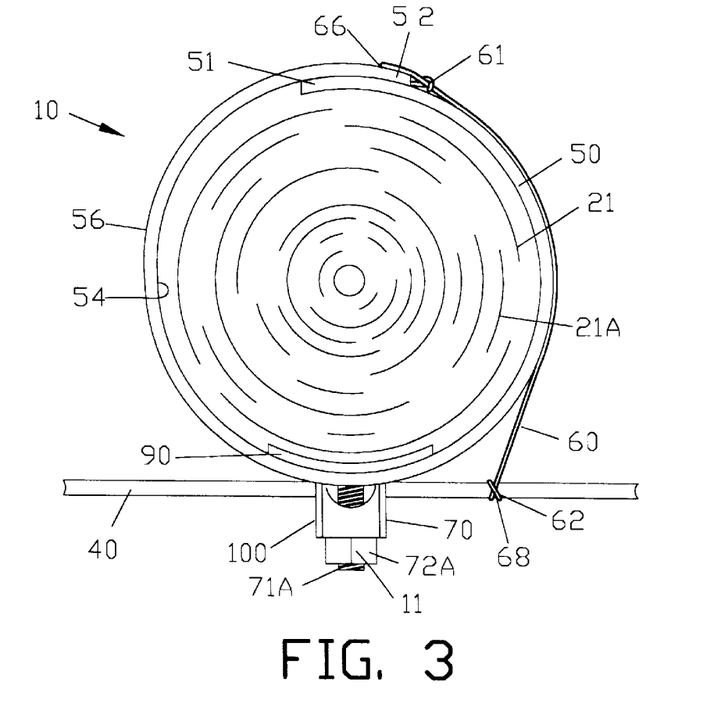
FIG. 3 is a sectional view along line 3—3 in FIG. 2.
Figure 4:
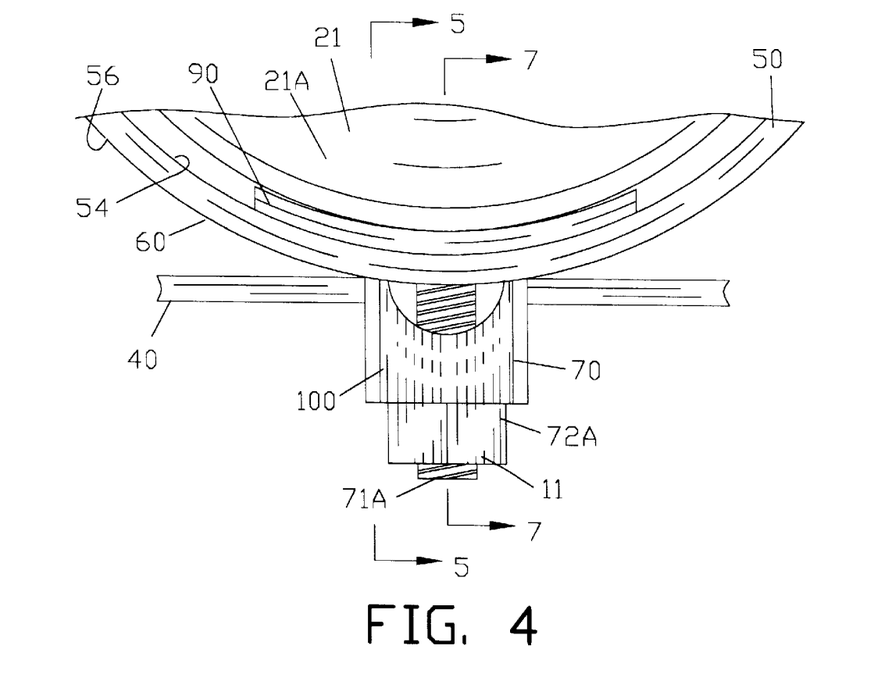
FIG. 4 is an enlarged view of a portion of FIG. 3.
Figure 5:
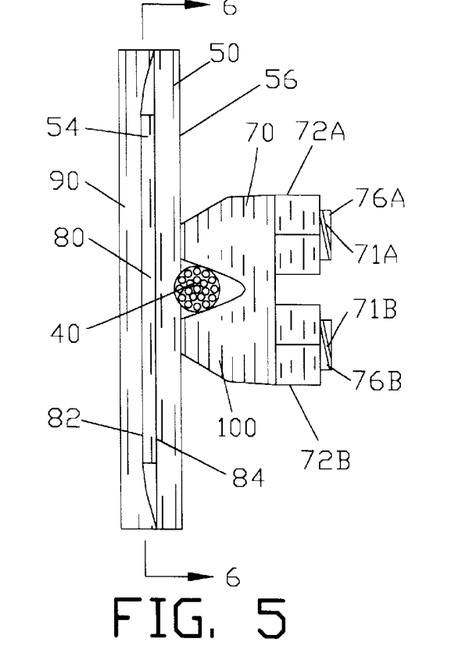
FIG. 5 is an enlarged sectional view along line 5—5 in FIG. 4.
Figure 6:
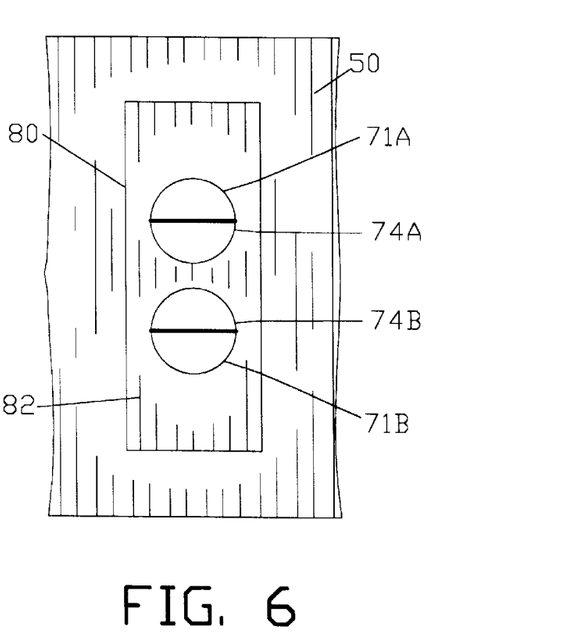
FIG. 6 is a sectional view along line 6—6 in FIG. 5.

The tree 21 is positioned adjacent to the wrapping 50. The first end 51 of the wrapping 50 is placed against the trunk 21A of the tree 21 as shown in FIG. 3. The second end 52 of the wrapping 50 is wrapped about the trunk 21A such that the second end 52 overlaps the first end 51 as shown in FIG. 3. The second end 62 of the strap 60 is secured to the cable 40 by a knot 68 for maintaining the position of the second end 52 of the wrapping 50. The strap 60 prevents the unwrapping of the second end 52 of the wrapping 50.

The tree 21 may be readily removed from the supporting device 10 by the unfastening the knot 68 on the second end 62 of the strap 60. The second end 52 of the wrapping 50 will uncoil and a first and second ends 51 and 52 of the wrapping 50 may be opened to permit the tree 21 to be removed therefrom. The present invention provides a simple and efficient manner to support a plurality of trees 20 by a cable.

Figure 11:
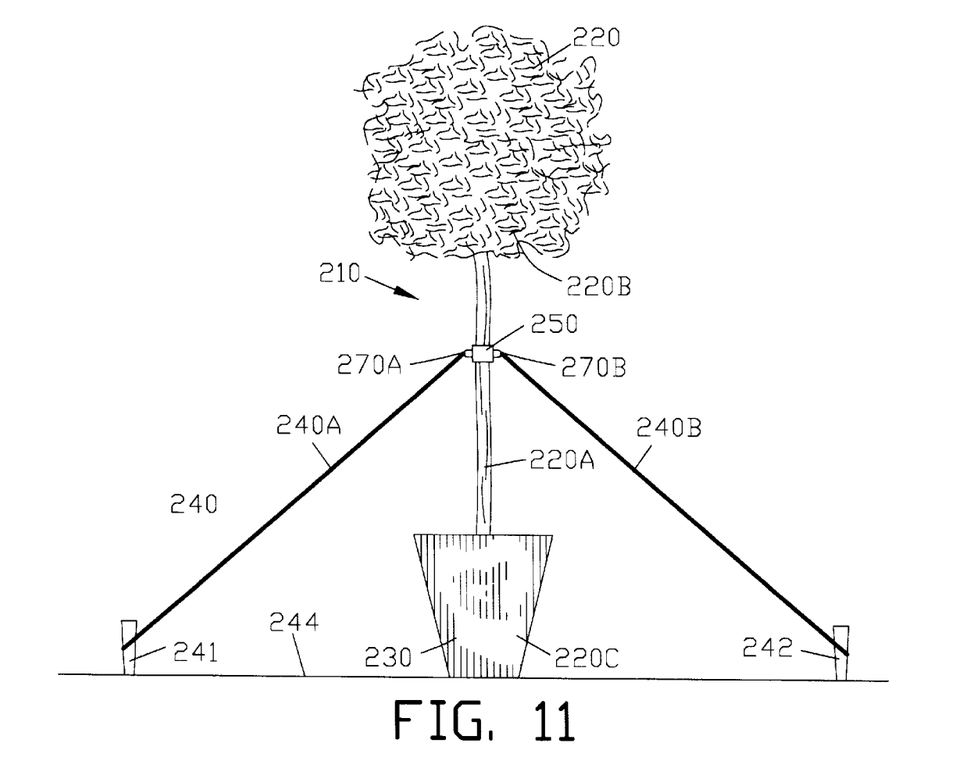
FIG. 11 is a view of a second embodiment of a support system for supporting a tree incorporating the support device of the present invention.
Figure 12:
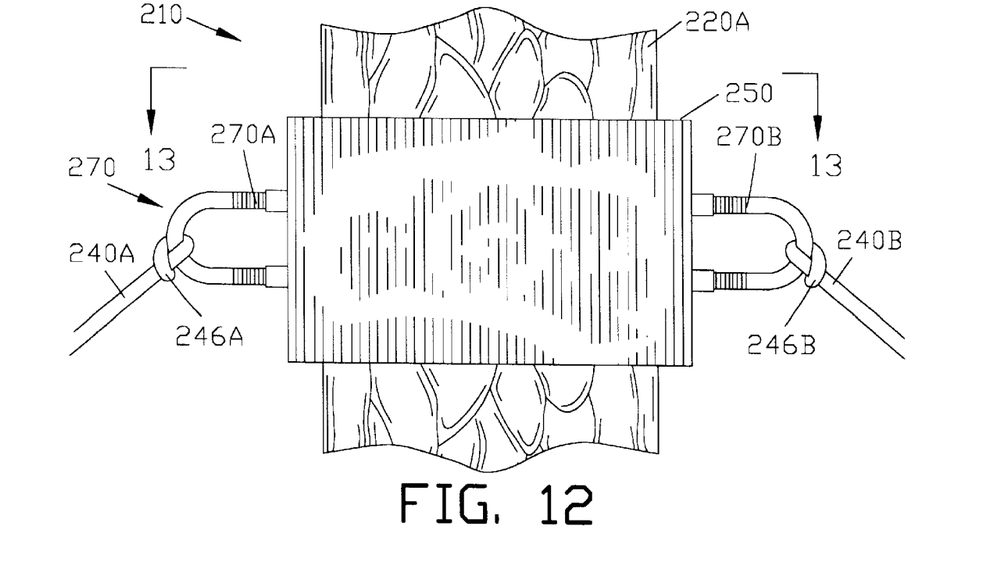
FIG. 12 is an enlarged view of a portion of FIG. 11.

FIG. 11 is a view of a second embodiment of a support system 210 of the present invention for supporting a tree 220. The trees 220 comprise a tree trunk 220A, tree foliage 220B and tree roots 220C. The roots 220C of the tree 220 are contained within a container 230. The tree is representative of a young tree having roots 220C located in a container 230 having a volume in the range of fifteen to twenty gallons.

The support system 210 of the present invention comprises a plural extending cable 40 shown as cables 240A and 240B secured to plural supports 241 and 242. The plural supports 241 and 242 are secured relative to a ground surface 244.

FIGS. 12–18 illustrate enlarged views of the support device 210 shown in FIG. 11. The support device 210 comprises a wrapping 250 extending between a first and a second wrapping end 251 and 252. The wrapping 250 defines an inner surface 254 and an outer surface 256. Preferably, the wrapping 250 is a substantially flexible wrapping formed from a flexible web of a natural or synthetic material as set forth above.

The support device 210 comprises a strap 260 for tethering the wrapping 250 to the tree 220. The strap 260 comprises a substantially flexible cord 260 formed from a natural or synthetic material. The strap 260 extends between a first and a second strap end 261 and 262.

An opening 266 is defined in the second end 252 of the wrapping 250. The first strap end 261 of the strap 260 is threaded through the opening 266 for securing the strap 260 to the second end 252 of the wrapping 250.

The support device 210 comprises a fastener 270 secured to the wrapping 250 for affixing to the plural cables 240A and 240B to support the tree 220 thereby. In this embodiment of the invention, the fastener 270 comprises plural mechanical fasteners 270A and 270B with each of the plural mechanical fasteners 270A and 270B being in the form of an eyelet. In this embodiment of the invention, the plural fasteners 270A and 270B are identical.

As best shown in FIGS. 15–18, each of the plural fasteners 270A and 270B comprises a first and a second threaded member 271A and 272B. The first threaded member 271 is shown as a plural first threaded members 271A and 271B whereas the second threaded member 272 is shown a plural second threaded members 272A and 272B.

The first threaded members 271A and 271B are shown as flat head machine nuts having a flat heads 274A and 274B and threaded nuts 276A and 276B. The first threaded members 271A and 271B may be permanently secured to the wrapping 250 by suitable means such as a friction engagement, press fit engagement, adhesives, braising, welding or the like. In the alternative, the first threaded members 271A and 271B may include integral fingers for affixing to the wrapping 250. One example of the fastener suitable for use a first threaded members 271A and 271B is a fastener commonly referred to as a T-Nut.

The threaded nuts 276A and 276B of the first threaded members 271A and 271B extend through the apertures 258A and 258B formed in the wrapping 250. In one alternative of the invention, the first threaded members 271A and 271B are held captive by the protective member 290.

The protective member 290 is disposed on the wrapping 250 to overlay the fastener 270 for protecting the tree 220 from the first threaded fasteners 271A and 271B. Preferably, the protective member 290 comprises a resilient padding material formed from a natural or synthetic material. The protective member 290 levels the unevenness formed about the periphery of the first threaded fasteners 271A and 271B. In addition, the protective member 290 levels any unevenness formed by the flat heads 274A and 274B of the first threaded fasteners 271A and 271B. Preferably, the protective member 290 is permanently secured to the wrapping 250 by suitable means such as stitching, adhesives or the like.

The second threaded member 272 comprises a U-shape member 300 having plural threaded machine screws 272A and 272B for threadably engaging with the threaded nuts 276A and 276B of the first threaded members 271A and 271B.

Figure 13:
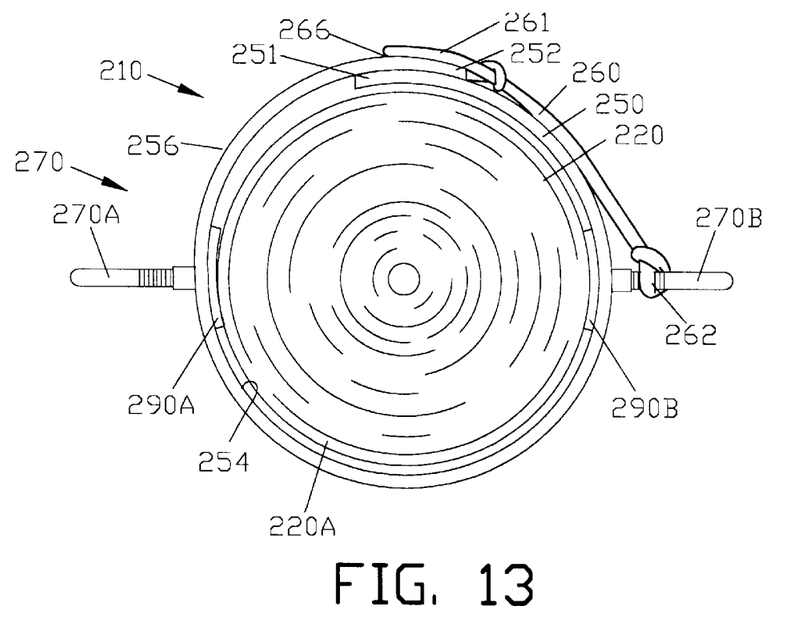
FIG. 13 is a sectional view along line 13—13 in FIG. 12.
Figure 14:
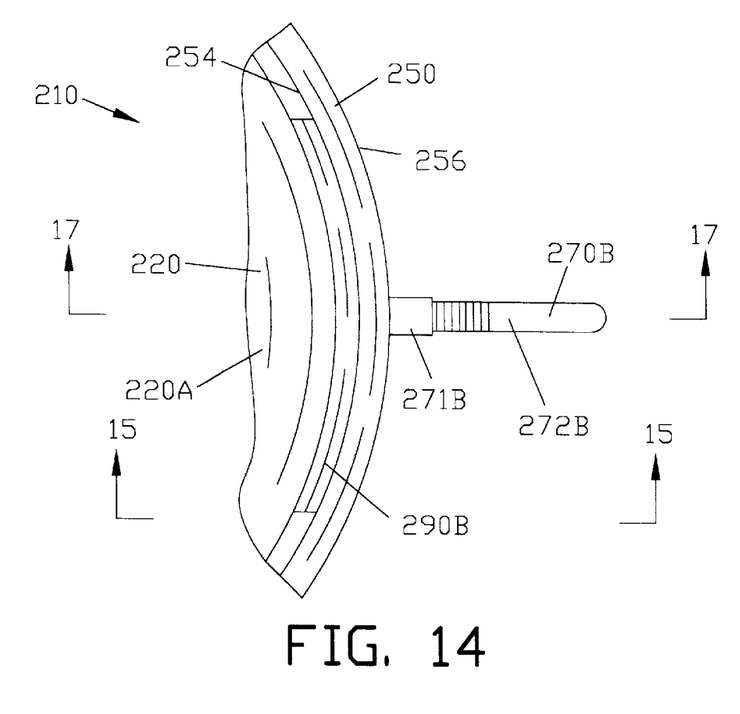
FIG. 14 is an enlarged view of a portion of FIG. 13.
Figure 15:
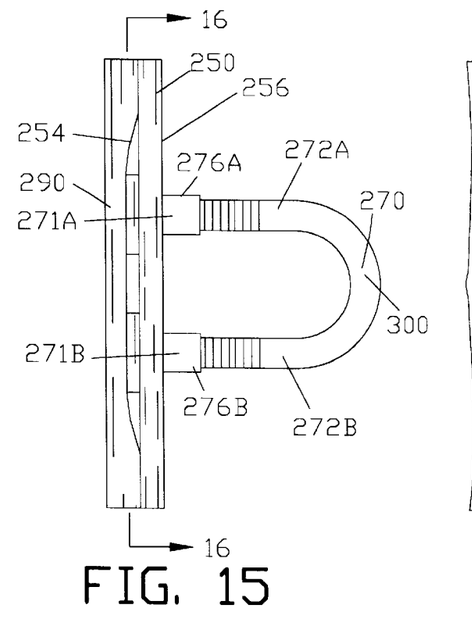
FIG. 15 is an enlarged sectional view along line 15—15 in FIG. 14.
Figure 16:
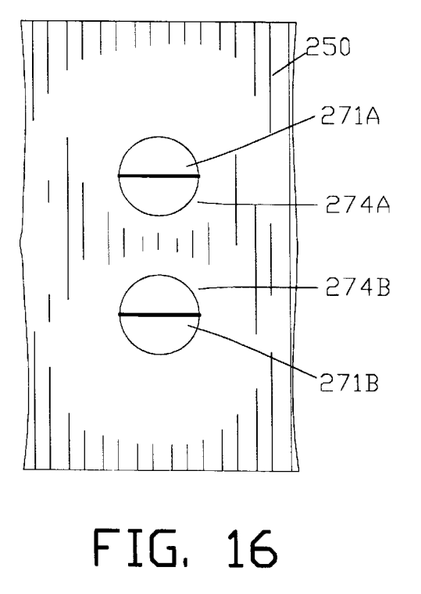
FIG. 16 is a sectional view along line 16—16 in FIG. 15.
Figure 17:
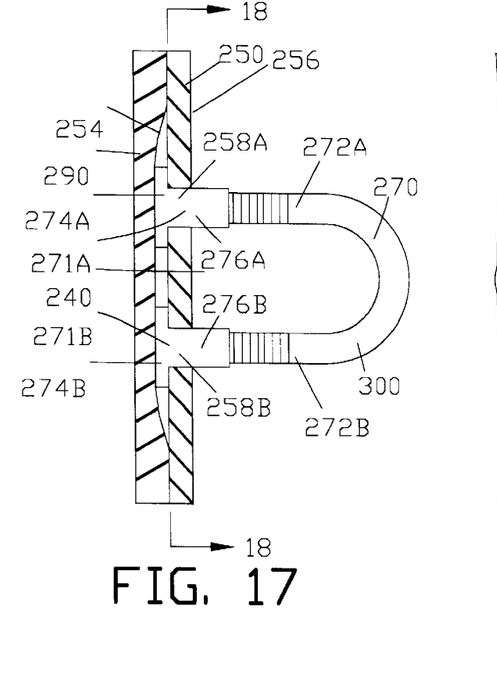
FIG. 17 is a sectional view along the line 17—17 in FIG. 14.
Figure 18:
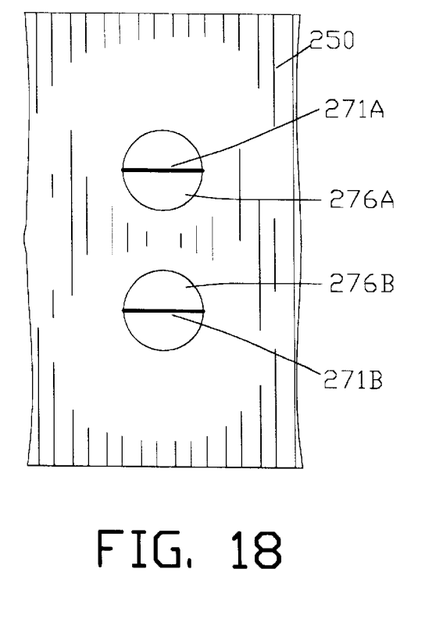
FIG. 18 is a sectional view along line 18—18 in FIG. 17.

The first end 251 of the wrapping 250 is placed against the trunk 220A of the tree 220 as shown in FIG. 13. The second end 252 of the wrapping 250 is wrapped about the trunk 220A such that the second end 252 overlaps the first end 251 as shown in FIG. 13. The second end 262 of the strap 260 is secured by a knot for maintaining the position of the second end 252 of the wrapping 250. The strap 260 prevents the unwrapping of the second end 252 of the wrapping 250. The cables 240A and 240B are installed on the plural fasteners 270A and 270B.

Figure 19:
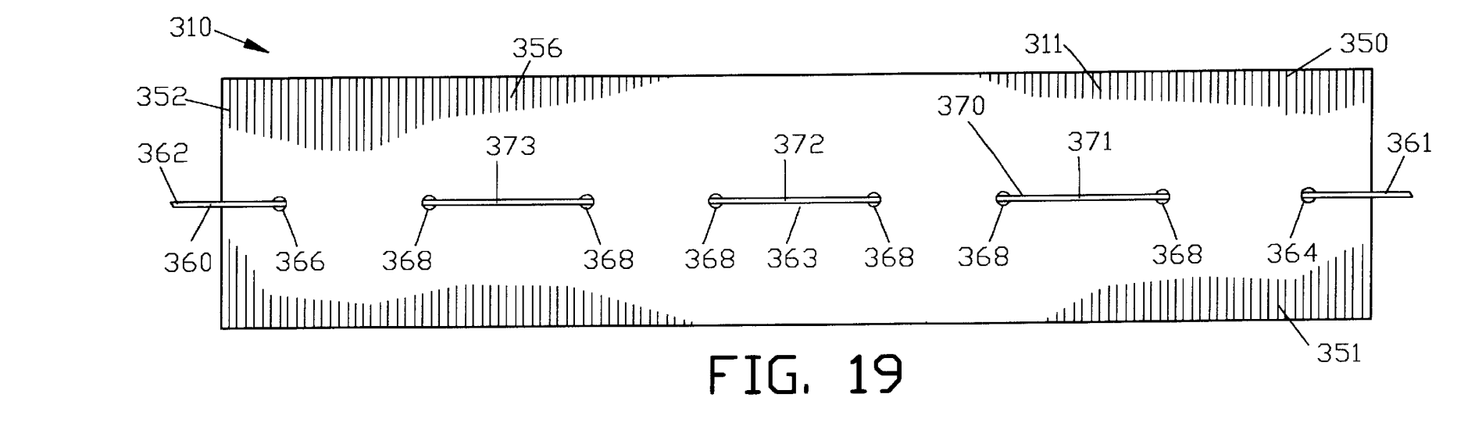
FIG. 19 is a front view of a third embodiment of a support device of the present invention prior to installation of a plant or tree.
Figure 20:
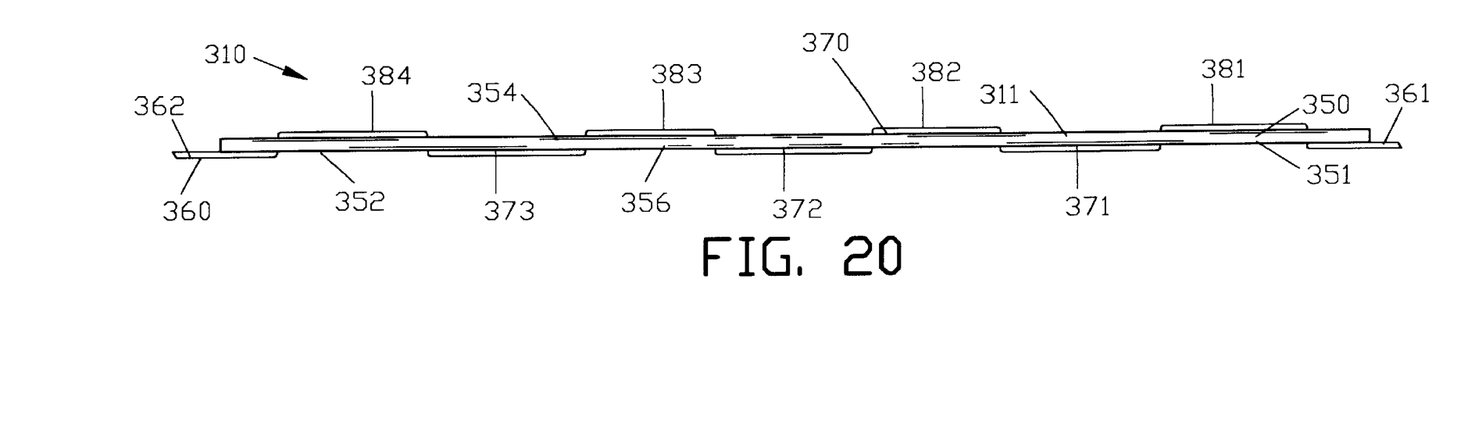
FIG. 20 is a top view of FIG. 9.

FIGS. 19 and 20 are front and top view of a third embodiment of a support device 310 of the present invention prior to installation of a plant or tree. The support device 310 comprises a wrapping 350 extending between a first and a second wrapping end 351 and 352. The wrapping 350 defines an inner surface 354 and an outer surface 356. Preferably, the wrapping 350 is a substantially flexible wrapping formed from a flexible web of a natural or synthetic material as set forth above.

The support device 310 comprises a strap 360 for tethering the wrapping 350 to the tree. The strap 360 comprises a flexible cord 360 extending between a first and a second strap end 361 and 362 with an intermediate portion 363 disposed therebetween.

A first and a second opening 364 and 366 is defined in the first and second end 351 and 352 of the wrapping 350. The first and second openings 364 and 366 are spaced from the first and second wrapping ends 351 and 352 of the wrapping 350. A plurality of intermediate openings 368 are defined in the wrapping 350 between the first and second openings 364 and 366.

The first strap end 361 of the strap 360 is threaded through the first opening 364 whereas the second strap end 362 of the strap 360 is threaded through the second opening 366. The intermediate portion 363 of the strap 360 is threaded through the plurality of intermediate openings 368.

The support device 310 comprises a fastener 370 secured to the wrapping 350 for affixing to the a cable or plural cables to support the tree thereby. In this embodiment of the invention, the fastener 370 comprises plural fasteners 371–373 located on the outer surface 356 of the wrapping 350. The plural fasteners 371–373 comprise regions of the intermediate portion 363 of the strap 360. The intermediate portion 363 of the strap 360 defines regions 381–384 located on the inner surface 354 of the wrapping 350.

The first end 351 of the wrapping 350 is placed against the trunk of the tree. The second end 352 of the wrapping 350 is wrapped about the trunk of the tree such that the second end 352 overlaps the first end 351. Since the first and second openings 364 and 366 are spaced from the first and second wrapping ends 351 and 352 of the wrapping 350, the second end 352 can overlap the first end 351.

The first end 361 is secured to the second end 362 of the strap 360 by a knot (not shown) for maintaining the position of the second end 352 of the wrapping 350 relative to the first end 361 of the wrapping 350. The strap 360 prevents the unwrapping of the second end 352 of the wrapping 350 relative to the first end 361 of the wrapping 350.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A device for supporting a tree with a cable, comprising:
   a wrapping for encircling the tree;
   a strap for tethering said wrapping to the tree;
   a fastener secured to said wrapping for affixing to the cable to support the tree by the cable; and
   said fastener being a mechanical fastener in the form of a compression fitting to provide a compression force to the cable for securing said mechanical to the cable.

2. A device for supporting a tree with a cable as set forth in claim 1, wherein the cable includes a horizontally extending cable.

3. A device for supporting a tree with a cable as set forth in claim 1, wherein the cable is a braided steel wire.

4. A device for supporting a tree with a cable as set forth in claim 1, wherein the cable is affixed to a support secured relative to a ground surface.

5. A device for supporting a tree with a cable as set forth in claim 1, wherein said wrapping includes a substantially flexible wrapping.

6. A device for supporting a tree with a cable as set forth in claim 1, wherein said wrapping includes a substantially flexible wrapping extending between a first and a second wrapping end; and
   said wrapping encircling the tree with said second end of said wrapping overlapping said first end of said wrapping.

7. A device for supporting a tree with a cable as set forth in claim 1, wherein said wrapping includes a substantially flexible wrapping formed from a flexible web of polymeric material.

8. A device for supporting a tree with a cable as set forth in claim 1, wherein said strap comprises a flexible cord for tethering said wrapping to the tree.

9. A device for supporting a tree with a cable as set forth in claim 1, wherein said strap comprises a flexible cord for tethering said wrapping to the tree; and said cord extending between a first and a second cord end with said first cord end being secured to said fastener.

10. A device for supporting a tree with a cable as set forth in claim 1, wherein said fastener includes a mechanical fastener for securing to a cable.

11. A device for supporting a tree with a cable as set forth in claim 1, wherein said fastener includes a mechanical fastener in the form of an eyelet.

12. A device for supporting a tree with a cable as set forth in claim 1, wherein said fastener has a threaded member for providing a compression force to the cable upon rotation of said threaded member for securing said fastener to the cable.

13. A device for supporting a tree with a cable as set forth in claim 1, wherein said fastener comprises a first and a second threaded member;

said first threaded member being secured to said wrapping; and said second threaded member providing a compression force to the cable upon rotation of said second threaded member relative to said first threaded member for securing said fastener to the cable.

14. A device for supporting a tree with a cable as set forth in claim 1, wherein said fastener comprises a first and a second threaded member;

said first threaded member being secured to said wrapping;

said second threaded member providing a compression force to the cable upon rotation of said second threaded member relative to said first threaded member for securing said fastener to the cable; and said second threaded member being removable from said first threaded member for inserting and removing said cable from said fastener.

15. A device for supporting a tree with a cable as set forth in claim 1, wherein said fastener comprises a first and a second threaded member;

said first threaded member being secured to said wrapping;

said second threaded member providing a compression force to the cable upon rotation of said second threaded member relative to said first threaded member for securing said fastener to the cable; and said first fastener member extending through said wrapping for securing said fastener thereto.

16. A device for supporting a tree with a cable as set forth in claim 1, wherein said fastener comprises a first and a second threaded member;

said first threaded member being secured to said wrapping;

said second threaded member providing a compression force to the cable upon rotation of said second threaded member relative to said first threaded member for securing said fastener to the cable; and a protective member disposed on said wrapping for protecting the tree from the first fastener member.

17. A device for supporting a tree with a cable as set forth in claim 1, wherein said fastener comprises a first and a second threaded member;

said first threaded member being secured to said wrapping;

said second threaded member providing a compression force to the cable upon rotation of said second threaded member relative to said first threaded member for securing said fastener to the cable;

a protective member disposed on said wrapping for protecting the tree from the first fastener member; and an adhesive securing said protective member to said wrapping.

18. A device for supporting a tree with a cable as set forth in claim 1, wherein the cable is a braided steel wire; and said fastener comprises a wire grip fastener.

19. A device for supporting a first tree of a plurality of trees, with each of the plurality of trees being supported by a common horizontally extending cable, comprising:

a flexible wrapping for encircling the trunk of the first tree;

a strap including a flexible cord for tethering said wrapping about the trunk of the first tree;

a fastener comprising a first and a second threaded member;

said first threaded member being secured to said wrapping;

said second threaded member providing a compression force to the cable upon rotation of said second threaded member relative to said first threaded member for securing said fastener to the cable to support the first tree by the horizontally extending cable; and said second threaded member being removable from said first threaded member for inserting and removing said cable from said fastener.

20. A device for supporting a tree with a cable, comprising:

a flexible wrapping for encircling the tree;

a strap for tethering said wrapping to the tree;

a fastener secured to said wrapping for affixing to the cable to support the tree by the cable;

said fastener being a mechanical fastener in the form of a compression fitting to provide a compression force to the cable to force the cable against flexible wrapping for securing said mechanical fastener to the cable.

* * * * *